June 9, 1942. J. D. CRECCA Re. 22,108

MEANS FOR SECURING SHEATHING TO METAL

Original Filed Nov. 8, 1937

INVENTOR
JOHN D. CRECCA.
BY
John J. Fitzgerald
ATTORNEY

Reissued June 9, 1942

Re. 22,108

UNITED STATES PATENT OFFICE 22,108

MEANS FOR SECURING SHEATHING TO METAL

John D. Crecca, United States Navy

Original No. 2,134,705, dated November 1, 1938, Serial No. 173,442, November 8, 1937. Application for reissue July 15, 1940, Serial No. 345,675

18 Claims. (Cl. 114—84)

(Granted under the act of March 3, 1883, as amended April 30, 1928; 370 O. G. 757)

This invention relates to an improved method and improved means for securing sheathing to metal, and more especially to the welding of a stud bolt to a metal surface with the sheathing already in place without the possibility of scorching or burning the sheathing during the welding process.

In a copending application of the present applicant, Serial No. 686,095, filed August 21, 1933, now abandoned there has been disclosed a method and means for securing a wooden sheathing to a metal surface including welding of a securing stud bolt to the metal surface after the sheathing is already placed in position. Another copending joint application, Serial No. 706,509, filed January 13, 1934, now Patent No. 2,057,670, issued Oct. 20, 1936, discloses an apparatus which can be most efficiently and economically used under the usually encounterable conditions in carrying out this invention in carrying out this invention and practicing the method disclosed therein.

In certain forms of the invention disclosed in the method and apparatus of the previous applications it has been found that there is a possibility with other than the most expert welders of scorching or burning some of the counterbored area of the sheathing while the stud is being secured.

The present invention provides means for protecting the sheathing from being scorched or burned by the heat of the electric welding operation even when performed by less skilled workmen. This means insures, in all cases, a firmer and more durable fastening of the sheathing to the metal surface.

Heretofore, the wood-sheathing of metal has been limited usually to thick wood capable of withstanding the wear and impacts of heavy weights. Even with such sheathing it was difficult for others than the more skilled and expensive welders to perform the welding without appreciably scorching and weakening the securement. It was even more difficult for others than the welders of the highest skill, and naturally commanding correspondingly large compensation, to efficiently and durably weld to metal the securements of thin sheathing as thin or thinner than present house flooring and ceiling. The present invention renders it substantially as easy, convenient, and safe from scorching, to weld to metal the securements for thin sheathing as an insulating or a service or ornamental covering of the metal, such that even ordinary workmen may be quickly taught to at least as quickly and safely weld to metal the metal securements of thin as of thick wood-sheathing. The sheathing may be of wood, pressed fiber plates, linoleum or other composition sheets, metal or other material, especially where the material comprising the sheathing is such that its most efficient and economical securement by means of welding may impair such material, or the durability or rigidity of its securement or a characteristic or property of the material.

The disclosures of the designated applications, as well as of this application, may each employ sheathing of wood, composition, or otherwise, and the metal surface sheathed may be a ship's deck, a cabin wall or ceiling, or a building floor, wall or ceiling, or the surface of an article of furniture such as office furniture or safes, or otherwise, where it is desired that the object itself may be made of metal and where it is further desired that the object be covered with wood, composition or other type of sheathing without the securing element penetrating the metal surface of, or perforating the object.

In the following description the invention is particularly described as including the application of a wood floor or sheathing to a ship's deck or any metal suface as a particular example of this invention, but it will be understood that such particular description is not considered as a limitation of this invention except as defined within the scope of what is claimed.

Reference is to be had to the accompanying drawing forming a part of this specification, in which like reference characters indicate corresponding parts throughout the several views, and in which.

Figure 1:
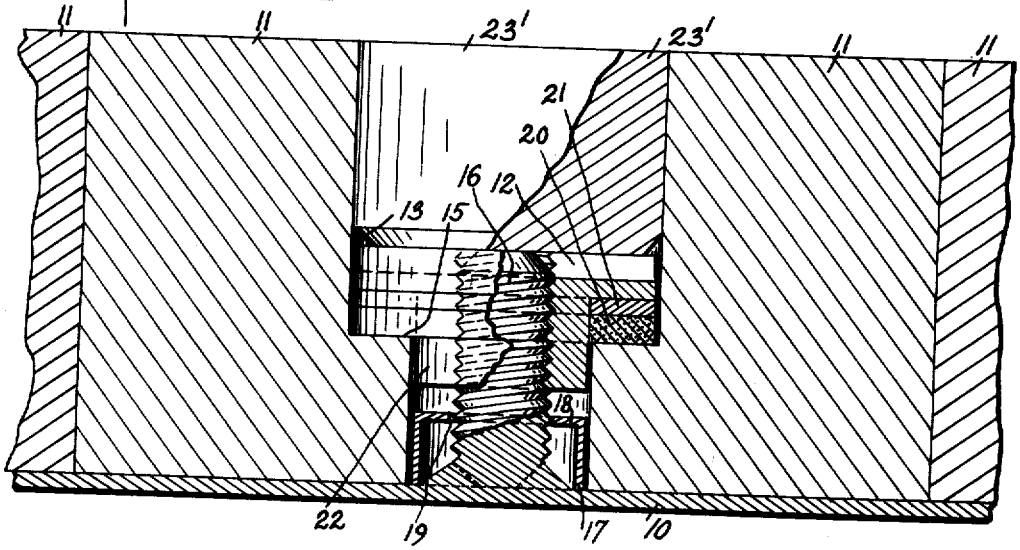
Figure 1 is a sectional view of a metal surface to which a sheathing has been applied according to this invention.
Figure 2:
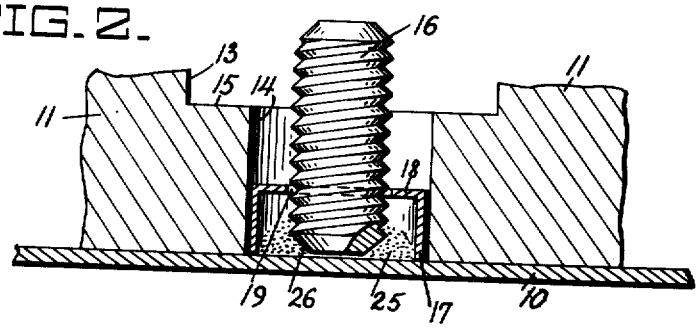
Fig. 2 is a partly sectional view of the securing means of Fig. 1 on an enlarged scale.
Figure 3:
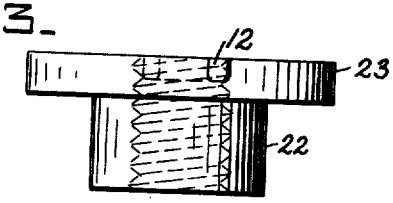
Fig. 3 is a side elevational view of the securing nut.

There is shown at 10 a metal surface such as a ship's deck to which it is desired to secure a sheathing, such as a wood flooring, herein shown as being a wooden sheathing made up of individual planks 11. This metal surface, as already brought out, may be a ship's deck; a wall, floor or ceiling surface of metal; furniture or safe surface of metal, or the like. The sheathing 11, while being referred to as being of wood planks, may be sheets of other material, including natural or artificial compositions of matter; for instance, it might be a semi-hard rubber of a phenolic condensation product, sometimes commercially known as Bakelite, or any other suitable type of sheathing, depending on the article of metal that is being covered and the use to which it is to be put.

In order to secure the planks of sheathing 11 to the metal surface 10 they are provided with a plurality of counterbored openings extending from the outer surface to the inner surface of the sheathing, the counter bored openings comprising a large bore opening 13 adjacent the outer surface, a small bore opening 14 adjacent its inner surface, and an intermediate shoulder 15 connecting the large bore opening 13 and the small bore opening 14. These counterbore openings may be preformed in the sheathing 11 before placing it into contact with the surface 10 or, if desired, may be bored through the sheathing when it is already in position on the metal surface 10.

A hollow thin ferrule 17 having an opening 19 in its top affording clearance for the bolt 16, may be inserted through the small bore 14 of the opening until its lower edge comes into contact with the metal surface 10. This ferrule 17 is preferably made of some fire-resistant material such as natural or artificial lava, furnace slag, asbestos, silicates, or other similar flame resisting, non-conducting materials. The outside diameter of the ferrule 17 is such in comparison to the inside diameter of the small bore 14 that it may be easily inserted through the small bore by the fingers, and it has a sufficiently slight frictional contact with the inside of the small bore 14 that it will remain in position therein even though the metal surface 10 be a side wall or a ceiling. A tighter contact than this has been found unnecessary.

Next a mixture of aluminum filings and iron filings 25 is dropped in through the opening 19 of the apertured flange 18 of the ferrule 17 to the metal surface 10, when the surface 10 is horizontal, as a floor. Should this surface 10 be a ceiling or wall, some adherent material such as glue may be placed on the surface to cause the filings to temporarily adhere thereto. The iron filings are preferably steel and are especially filings from steel forgings and not cast iron or cast steel filings.

Next the stud bolt 16 suitably held in the end of the welding apparatus is inserted through the counterbore 13 and opening 19 in the ferrule 17, the lower end of the stud bolt 16 being preferably tapered as shown at 26. This end 26 of the stud bolt 16 is brought close to but not into actual contact with the surface of the deck 10 and the electric current is turned on through the welding apparatus. This causes an electrical flux between the end 26 of the stud bolt 16 and the metal surface 10, and this electrical flux causes the filings 25 to act as an arc-inducing material, thereby creating a welding arc between the end of the stud bolt and the surface of the deck without the necessity of first touching the stud bolt to the deck. Immediately that this arc is created the end 26 of the stud bolt 16, the filings and the deck surface are raised to a welding temperature and the welding machine is operated to advance the stud bolt into contact with the deck surface and the welding current cut off, allowing the stud bolt to solidify itself with the deck surface and become an integral part thereof.

After the stud bolt 16 has been thus end-welded to the surface 10, a hemp grommet 20 is placed on the shoulder 15 and a metal washer 21 is placed above the grommet 20. A nut 22 having an externally projecting flange 23 is then threaded over a stud bolt 16, it being observed that the body of the nut 22 is of a diameter at least slightly less than the diameter of the small bore 14, while its flange 23 is of a diameter substantially greater than the diameter of the small bore 14 and at least slightly less than the diameter of the large bore 13. It will be further observed that both the grommet 20 and the washer 21 are provided with internal apertures of a diameter equal to or larger than the diameter of the body of the nut 22, so that as the nut 22 is threaded over the stud bolt 16 the flange 23 contacts with the upper surface of the washer 21 which, in turn, presses against the grommet 20 on the shoulder 15 of the counterbore. The nut 22 is then tightened by means of a Y-ended T-wrench adapted to engage slots 12 of nut flange 23, thereby compressing the help grommet 20 tightly against the shoulder 15 and the side walls of the large bore 13, making it impossible for any moisture to pass down along the side walls of the counterbore to the metal surface 10. When the nut 22 is tightly in position a plug 23' of a material preferably similar to material of the sheathing 11 is then placed in the large bore 13, the outer surface of the plug 23' being brought flush with the outer surface of the sheathing 11. Any suitable number of counterbores and stud bolts will be provided for each plank or sheet of sheathing, and as each plank or sheet is firmly secured an adjacent plank or sheet is next secured adjacent thereto until the entire metal surface 10 has been covered as desired.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. In combination, a metal surface, a sheating liable to be impaired by high temperatures, said sheathing having an opening therethrough and means for securing said sheathing to said metal surface comprising a threaded male member end-welded to said surface through said opening, an apertured, flanged fire-resistant ferrule enclosing said welded end and insulating said sheathing from the heat of said welding and protecting the threads of said threaded member from weld spatters above the welded portion, a threaded member screwed to said male member and having an externally projecting flange at its outer end contacting the sheathing.

2. In combination, a metal surface, a sheathing liable to be impaired by high temperatures, said sheathing having an opening therethrough and means for securing said sheathing to said metal surface comprising a threaded male member end-welded to said surface through said opening, a fire-resistant ferrule loosely enclosing and spaced from said welded end and insulating said sheathing from the heat of said welding, a threaded member screwed to said male member and having an externally projecting flange at its outer end contacting the sheathing.

3. In combination, a metal surface, a sheathing liable to be impaired by high temperatures, said sheathing having an opening therethrough and means for securing said sheathing to said metal surface comprising a threaded male member end-welded to said surface through said opening, an apertured, flanged fire-resistant ferrule enclosing said welded end and insulating said sheathing from the heat of said welding and protecting the threads of said threaded member from weld spatters above the welded portion, and a threaded member screwed to said male member for securing the sheathing thereto.

4. In combination, a metal surface, a sheathing liable to be impaired by high temperatures, said sheathing having an opening therethrough and means for securing said sheathing to said metal surface comprising a threaded male member end-welded to said surface through said opening, a fire-resistant ferrule loosely enclosing and spaced from said welded end and insulating said sheathing from the heat of said welding, and a threaded member screwed to said male member for securing the sheathing thereto.

5. In combination, a metal surface, a sheathing liable to be impaired by high temperatures, said sheathing having an opening therethrough, means for securing said sheathing to said metal surface comprising a threaded holding member end-welded to said surface, a heat resistant member loosely surrounding and spaced from the welded member and a threaded fastening member cooperating with the welded member and having a portion in engagement with the sheathing.

6. In combination, a metal surface, a sheathing liable to be impaired by high temperatures, said sheathing having an opening therethrough, means for securing the sheathing to the metal surface comprising a threaded male holding member end-welded to said surface, a heat resistant ferrule loosely enclosing and spaced from the welded end of said member and insulating the sheathing from the welding heat, a threaded fastening member cooperating with the welded member and having a projecting flange at its outer end in engagement with the sheathing.

7. In combination, a metal surface, a sheathing liable to be impaired by high temperatures, said sheathing having an opening therethrough, a substantially rigid, form-retaining heat resistant ferrule loosely placed within said opening in spaced relation to the walls of said opening, means for securing said sheathing to said metal surface comprising a member end-welded to said surface through said opening and through said heat resistant ferrule, said ferrule insulating the sheathing from the welding heat, and a fastening member cooperating with the welded member for fastening the sheathing to the metal area.

8. The method of securing an area of through-perforated sheathing to a metal area which consists in loosely inserting in the perforation in spaced relation to the walls of the perforation an open-end member of substantially rigid, form-retaining heat-resisting material to insulate the sheathing from the harmfulness of a welding heat, inserting in said open-end member a holding member and end-welding the same to the metal area within the open end insulating member, and finally forcing into holding engagement with the welded holding member a member cooperating with said welded member and the sheathing to fasten the sheathing to the metal area.

9. In combination, a metal surface, a sheathing liable to be impaired by high temperatures, said sheathing having an opening therethrough, a substantially rigid, form-retaining heat resistant ring member loosely placed in said opening therethrough in spaced relation to the walls of said opening, and means for securing said sheathing to said metal surface and comprising a holding member end-welded within said heat resistant ring member to said surface, and a fastening member cooperating with the welded member for securing the sheathing thereto.

10. In combination, a metal surface, a sheathing liable to be impaired by high temperatures, said sheathing having an opening therethrough and means for securing said sheathing to said metal surface comprising a male member end-welded to said surface through said opening, a firse-resistant ferrule loosely enclosing and spaced from said welded end and insulating said sheathing from the heat of said welding, and a female member secured over said male member for securing the sheathing to the metal surface.

11. In combination, a metal surface, a sheathing liable to be impaired by high temperatures, said sheathing having an opening therethrough, a substantially rigid, form-retaining heat resistant ring member loosely placed in said opening therethrough in spaced relation to the walls of said opening, and means for securing said sheathing to said metal surface comprising a holding member end-welded through said heat resistant ring member to said metal surface, and a fastening member cooperating with the welded member, said fastening member having a portion in engagement with said sheathing.

12. In combination, a metal surface, a sheathing liable to be impaired by high temperatures, said sheathing having an opening therethrough, and means for securing said sheathing to said metal surface, comprising a threaded member end-welded to said surface through said opening, a fire resistant means loosely placed about and spaced from said welded end and insulating said sheathing from the heat of said welding, and a threaded member secured to said end-welded threaded member for securing the sheathing thereto.

13. In combination, a metal surface, a sheathing liable to be impaired by high temperatures, said sheathing having an opening therethrough, means for securing said sheathing to said metal surface comprising a threaded holding member end-welded to said surface, a heat resistant material loosely surrounding and spaced from the welded member and a threaded fastening member cooperating with the welded member for securing the sheathing thereto.

14. In combination, a metal surface, a sheathing liable to be impaired by high temperatures, said sheathing having an opening therethrough, means for securing the said sheathing to said metal surface comprising a member end-welded to said surface and having means for cooperating with a fastening member, a member of heat resistant material loosely surrounding a portion of said welded member and spaced both from said welded member and the walls of said opening and insulating the sheathing from the welding heat, and a fastening member cooperating with the fastening means of the welded member for fastening the sheathing to the metal area.

15. The method of securing an area of through-perforated sheathing to a metal area which consists in loosely inserting in the perforation a substantially rigid, form-retaining member of heat-resisting material spaced from the walls of the perforation to insulate the sheathing from the harmfulness of a welding heat, inserting in said member in spaced relation thereto a holding member and end-welding the same to the metal area within the insulating member, and finally forcing into holding engagement with the welded holding member a member cooperating with said welded member and the sheathing to fasten the sheathing to the metal area.

16. In combination, a metal surface, a sheathing liable to be impaired by high temperatures, said sheathing having an opening therethrough, means for securing said sheathing to said metal surface comprising a holding member electrically end-welded to said surface, a member of heat resistant material loosely surrounding and spaced from the welded member, and a fastening member cooperating with the welded member for securing the sheathing thereto.

17. In combination, a metal surface, a sheathing liable to be impaired by high temperatures, said sheathing having an opening therethrough, means for securing said sheathing to said metal surface comprising a holding member electrically end-welded to said surface, a member of heat resistant material loosely surrounding and spaced from the welded member, and a fastening member cooperating with the welded member and having a portion in engagement with the sheathing.

18. The method of securing an area of through-perforated sheathing to a metal area which consists in loosely inserting in the perforation a member of heat-resisting material to insulate the sheathing from the harmfulness of a welding heat, inserting in said perforation a holding member spaced from said insulating member and electrically end-welding the same to the metal area within the insulating member, and finally forcing into holding engagement with the welded holding member a member cooperating with said welded member and the sheathing to fasten the sheathing to the metal area.

JOHN D. CRECCA.